June 28, 1949. E. LINDERME 2,474,262
TRACTION-GAINING DEVICE
Filed Dec. 11, 1946 3 Sheets-Sheet 1
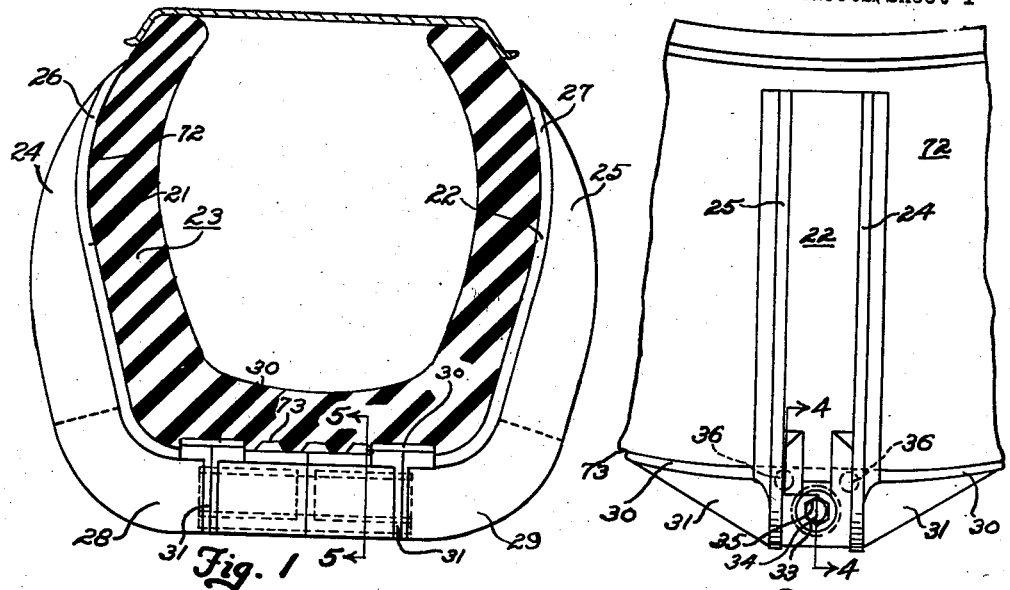
Fig. 1
Fig. 2
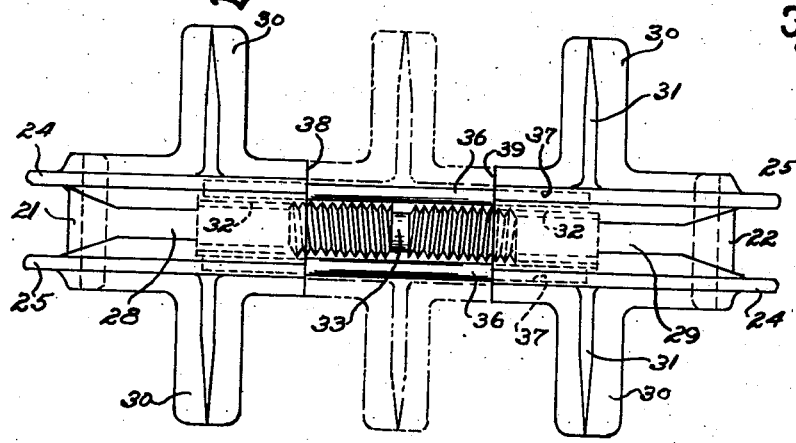
Fig. 3
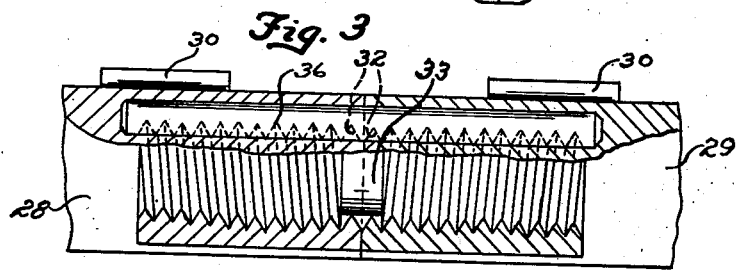
Fig. 4
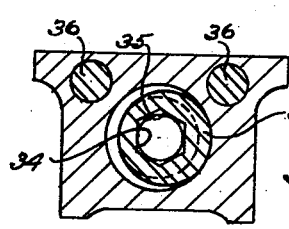
Fig. 5
INVENTOR.
Emil Linderme
BY
Woodling and Krost
attys.

June 28, 1949.  E. LINDERME  2,474,262
TRACTION-GAINING DEVICE
Filed Dec. 11, 1946  3 Sheets-Sheet 2
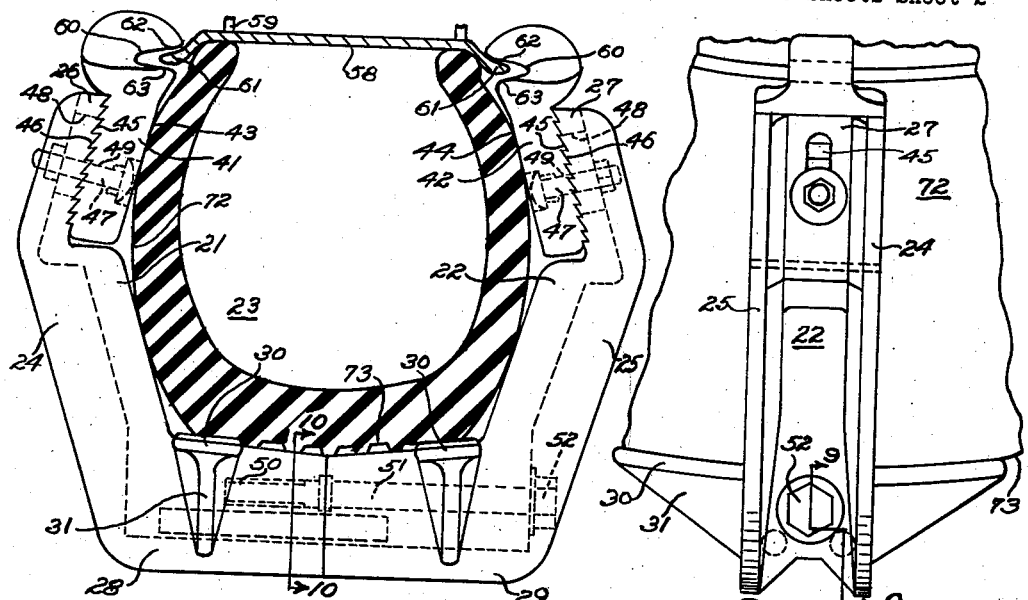
Fig. 6
Fig. 7
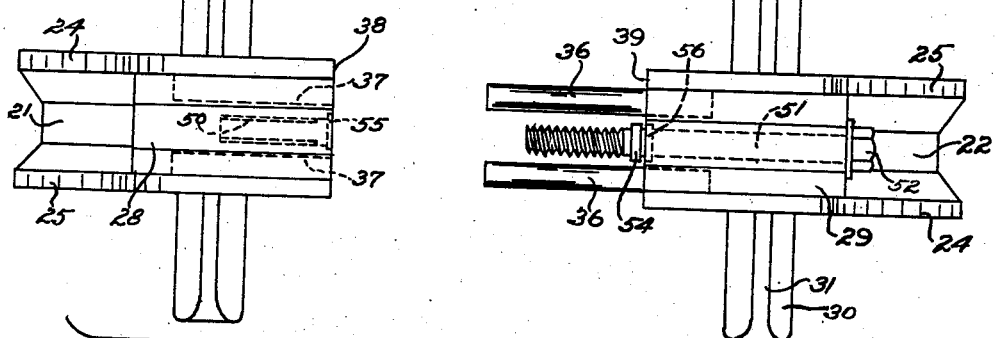
Fig. 8
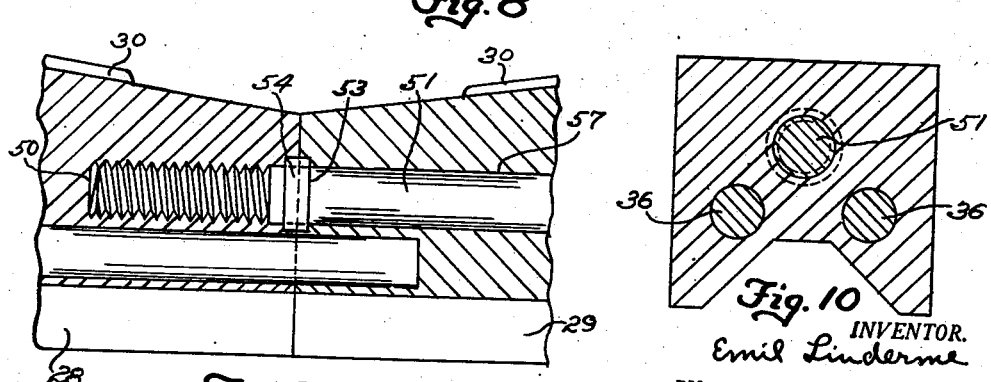
Fig. 9
Fig. 10
INVENTOR.
Emil Linderme
BY
Hoodling and Krost
attys.

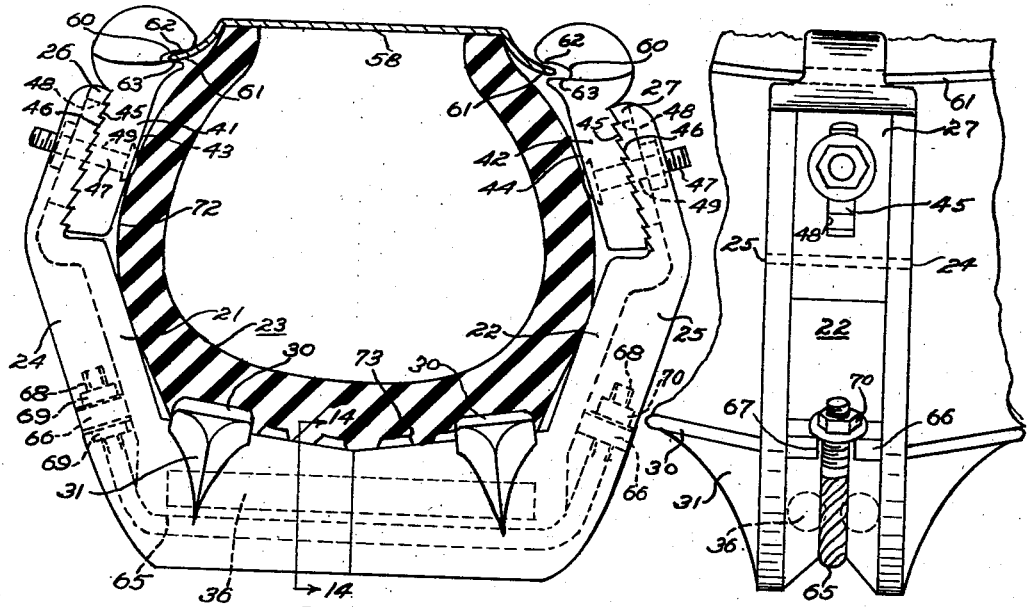
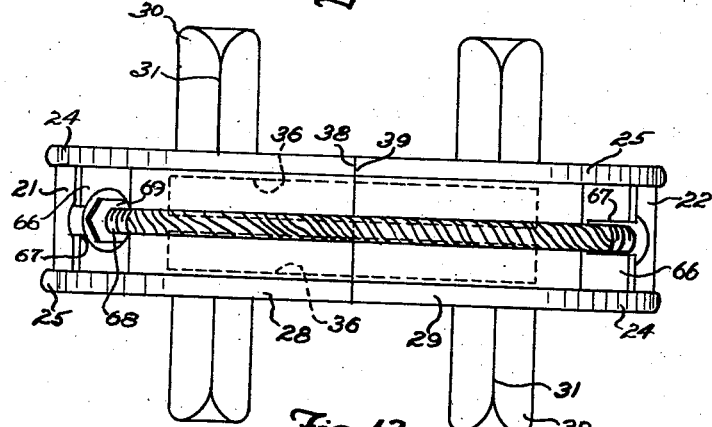
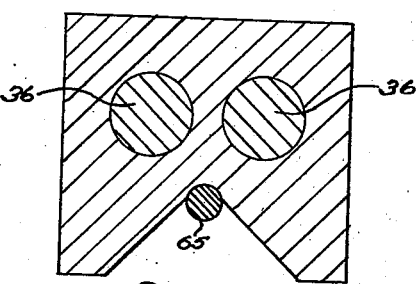

Patented June 28, 1949

2,474,262

UNITED STATES PATENT OFFICE 2,474,262

TRACTION-GAINING DEVICE

Emil Linderme, Shaker Heights, Ohio, assignor of one-third to Emil M. Linderme, one-third to Edwin G. Linderme, and one-third to Frederick W. Linderme Application December 11, 1946, Serial No. 715,492

8 Claims. (Cl. 152—227)

My invention relates in general to traction gaining devices, and more particularly to traction gaining devices for use in conjunction with a vehicle wheel.

This application is a continuation-in-part of my application Serial No. 654,745, entitled "Traction gaining device," filed March 15, 1946, and now abandoned.

An object of my invention is the provision of a traction gaining device for use in conjunction with any substantially annular body that tractionally moves relative to a surface.

Another object of the invention is to provide a device which can be quickly and easily attached to or detached from an automobile tire or the like, which is highly effective in getting out of ruts in mud, snow, ice, sand, and other spots or places in which traction is difficult or impossible.

Another object of the invention is the provision of a traction gaining device which consists of a minimum number of parts which are inexpensive to manufacture and assemble, which is light in weight, yet extremely rugged and durable in construction, and which readily lends itself to production in commercially desirable quantities.

Another object of my invention is the provision of a clamp-on traction gaining device that has means for positive engagement of the wheel on which it is used to prevent dislodgement by centrifugal force.

Other objects and a fuller understanding of my invention may be had by referring to the following description and claims, taken in conjunction with the accompanying drawing, in which:

Figure 1 is a front elevational view of a first form of the device, showing the manner in which it is applied to a tire;

Figure 2 is a side elevational view of the first form of the device as shown in Figure 1;

Figure 3 is a bottom plan view of the first form of the device with the parts separated preparatory to attachment of the device to a tire;

Figure 4 is a fragmentary cross-sectional view of the device taken along the line 4—4 of Figure 2;

Figure 5 is a fragmentary cross-sectional view of the device taken along the line 5—5 of Figure 1;

Figure 6 is a front elevational view of a second form of my device;

Figure 7 is a side elevational view of the form shown in Figure 6;

Figure 8 is a bottom plan view of the second form of the device with the parts separated;

Figure 9 is a fragmentary cross-sectional view of the device taken along the line 9—9 of Figure 7;

Figure 10 is a fragmentary cross-sectional view of the device taken on the line 10—10 of Figure 6;

Figure 11 is a front elevational view of a third form of my device;

Figure 12 is a side elevational view of the form shown in Figure 11;

Figure 13 is a bottom plan view of the third form of the device; and

Figure 14 is a fragmentary cross-sectional view of the device taken along the line 14—14 of Figure 11.

Generally, my invention comprises a traction gaining device for use with any substantially annular body that tractionally moves relative to a surface. I have found that my invention is equally applicable to tracks of track-laying vehicles as well as wheels of wheeled vehicles. I have chosen to describe my invention as pertaining to vehicle wheels, and more particularly to forms adapted for use with an automobile wheel. In the illustrated embodiment of my invention, I show two complementary members that are designed to be drawn together for engaging a wheel. The device therefore serves as an auxiliary cleat to provide extra traction therefor.

With reference to Figures 1 through 5 of my drawings, I show a first side-arm 21 and a second side-arm 22 which in my preferred embodiment are contoured to fit the periphery of a cross-section of an automobile tire 23. The tire 23 has annular side surfaces 72 and a tread portion or surface bearing portion 73. Each of the side arms 21 and 22 is provided with a pair of substantially parallel reinforcing flanges 24 and 25 which are formed integrally therewith and extend outwardly from such side arms away from the tire 23. The side arms 21 and 22 have respectively first ends 26 and 27 and second ends 28 and 29. The second ends 28 and 29 of the side arms 21 and 22 serve as bearing heads and are provided with lugs or ears 30 which are formed integrally therewith and extend laterally therefrom in the direction of a circumferential tread 73 of the tire 23. The ears 30 are designed to give an enlarged bearing surface on the tread of the tire 23, and are supported and reinforced by gussets or webs 31. An adjusting screw 33 having oppositely threaded ends is designed to provide relative movement of the two side arms. A threaded aperture 32 is provided in each of the second ends 28 and 29, for the reception of the adjusting screw 33. The screw 33 has an axial bore 34 extending therethrough, one end 35 of which is adapted to be receptive to a wrench. In my preferred embodiment, I show this end 35 as being of hexagonal shaped cross-section so as to adapt it for the reception of the hexagonal shaped end of a wrench. A pair of support guide pins 36 is provided in the second ends or bearing heads 28 and 29. These pins 36 act as transverse support means to provide strength and rigidity to the device to effectively make it a unified structure especially when engaging the tire. The pins 36 align the side arms 21 and 22 with respect to each other and insure rectilinear movement thereof to prevent binding of the screw 33. In the illustrated embodiment, one end of each of the support guide pins 36 is anchored in the second end 28, and protrudes from the wall surface 38. Bores 37 having openings in the wall surface 39 are provided in the second end 29, and the protruding ends of each pin are slidable therein. The side arms 21 and 22, together with their associated parts 24 through 31, inclusive, are preferably made in the form of aluminum castings, in which they are light in weight and yet extremely rugged and durable.

In operation, a wrench is used to separate the side arms 21 and 22 sufficiently to permit them to be easily slipped over the side wall 72 of the tire 23. One end of the wrench is entered into the hexagonal end 35 of the bore 34 of the screw 33, and rotated to cause the aforesaid separation. This separation is shown in Figure 3 of the drawing. When the side arms 21 and 22 have been separated, the device may be slipped over the tire 23 and the side arms moved into engaging relationship to the tread 73 and the side walls 72 of the tire 23, as shown in Figure 1. Thereafter, the screw 33 may be rotated until the device engages the tire 23.

I have found it preferable to have the walls 38 and 39 actually abut each other to prevent the entrance of dirt or foreign matter into the space between such walls during the use of the device. However, I have found that my device is completely operative with tires of slightly varying size, and the fact that the walls 38 and 39 do not actually abut is in no way harmful to the operativeness of my device. The device, when thus clamped to the tire, virtually becomes a part of the tire and cannot be dislodged therefrom by any pressure ordinarily applied to the device by the turning of a wheel in a rut. It is preferable, of course, to apply one of the devices to each of the driving wheels of the automobile or vehicle, but it is also feasible to apply the devices to the non-driven wheels of the vehicle to prevent side slippage, that is, for example, when the vehicle is moved cross-ways of a slope. As the driving wheels are turned, the flanges 24 and 25 and the second ends 28 and 29 come into engagement with the ground, snow or ice, and thus provide the necessary traction. The lugs or ears 30 bear against and conform to the circumferential curvature of the tread 73 of the tire and are instrumental in providing a sufficient bearing surface of the side arms 21 and 22 against canting of such side arms when they come into engagement with the ground.

In a second form of my invention, which is shown in the Figures 6 through 10, inclusive, I show the tire 23 as mounted on a rim 58 having annular rim edges 61, which rim 58 is on a wheel 59. The first ends 26 and 27 of the side arms 21 and 22 are, in this second form of my invention, provided with rim engaging lugs 41 and 42, respectively.

The rim engaging lugs 41 and 42 have surfaces 43 and 44, respectively, that are adapted to contact the side walls of the tire 23. A toothed surface 45 is provided on each rim engaging lug, and a correspondingly toothed surface 46 is provided on the inner surface of the first ends 26 and 27. Bolts 47 that extend through a slot 48 in the first end and a hole 49 in the rim engaging lugs, are used to fasten the rim engaging lugs onto the first ends. The rim engaging lugs have a hooked end 60, which hooked end has an upper portion 62 and a lower portion 63. A threaded adjusting screw 51 is again provided to effect relative movement of the side arms. A threaded aperture 50 is provided in the second end 28, and a bore 57 is provided in the second end 29 for the reception of the threaded adjusting screw 51. In the illustrated embodiment, the screw 51 has a hexagonal head 52 to adapt it for the reception of a wrench. An annular groove 53 is provided in the screw 51 to receive a ring 54. A first countersink 55 is provided in the threaded aperture 50 of the second end 28 to receive the ring 54, and a second countersink 56 is provided in the bore 57 in the second end 29 to also receive the ring 54.

In operation, this form of my invention operates in substantially the same manner as the first form of my invention, wherein a wrench is applied to the head 52 of the screw 51 to rotate the screw and permit separation of the side arms 21 and 22 sufficiently to permit them to be easily slipped over the side walls of the tire 23.

The rim engaging lugs 41 and 42 may be adjusted for various sizes of tires. This adjustment may be effected by loosening of the bolts 47, a new positioning of the toothed surfaces 45 and 46, and a subsequent tightening of the bolt 47.

The action of the ring 54 in the annular groove 53 is to provide a positive movement of the side arms 21 and 22 as the screw 51 is rotated, which positive movement will have some free play equal to the combined depth of the two countersinks 55 and 56 minus the thickness of the ring 54. The rim engaging lugs 41 and 42 permit a positive engagement of the entire device with the rim 58 of the wheel 59. This positive engagement of the entire device with the wheel 59 prevents the possibility of any centrifugal force or any canting of the device from wrenching the device free from the tire 23. The hooked end 60 of the rim engaging lugs 41 and 42 is adapted to engage the rim edge 61. The manner in which engagement is made of the rim edge 61 by the hooked end 60 may vary in the different cases. As depicted in Figure 6, it is only necessary for the hooked ends 60 to be brought closer toward each other than the total width of the rim 58. Due to the symmetry of the tire and the device, this will assure that the hooked ends 60 encompass the rim edges 61 to prevent disengagement therefrom. The rim edges 61 will bear against the lower portions 63 of the hooked ends 60 when the traction device as a whole is bearing the weight of the vehicle, and the rim edges 61 will bear against the upper portions 62 of the hooked ends 60 when the device is thrown outwardly due to centrifugal force. The upper and lower portions 62 and 63 therefore limit the movement of the traction device upon the tire 23.

A third form of my invention, which is shown in the Figures 11 through 14, inclusive, again has first and second side arms 21 and 22 contoured to fit the periphery of the cross-section of an automobile tire 23. In this third form of my invention, the anchoring means which I employ is a cable 65. An anchoring web 66 is provided in each of the side arms 21 and 22, with a slot 67 therein. Fastening means are provided on each end of the cable 65, and I have preferred to make the device as nearly symmetrical as possible for weight balancing purposes and ease in manufacturing. The fastening means includes a threaded end portion 68, and nuts 69 one on each side of the anchoring web 66 on the side arm 21 to fasten the threaded end portion 68 of the cable 65 thereto. On the side arm 22 only one nut 70 is provided on the threaded end portion 68 of the cable 65 and this nut 70 is adapted to be tightened by wrench means to draw the two side arms 21 and 22 together along the support guide pins 36.

In operation, this device acts in a similar fashion to the second form hereinbefore described, in that the rim engaging lugs 41 and 42 engage the rim edges 61 to provide a positive engagement of the device with the tire 23 and the rim 58. The rim engaging lugs 41 and 42 may again be adjusted by a loosening of the bolt 47 and a new positioning of the toothed surfaces 45 and 46. The anchoring means in this form of my invention, which comprises the cable 65, serves a similar function as the screw 51 in the second form of the invention. By a loosening of the nut 70, the tension on the cable 65 may be reduced to a point where the threaded end portion 68 can be removed from the slot 67, and the side arms 21 and 22 moved apart from each other to permit the device to be slipped over the tire. The side arms may then be pushed together until the rim engaging lugs 41 and 42 engage the rim edges 61, then the threaded end portion 68 with the nut 70 thereon may be re-inserted in the slot 67. By tightening the nut 70 against the web 66, the two side arms 21 and 22 may be drawn together in a rectilinear motion along the support guide pins 36, until the device engages the tire 23, and more particularly until the hooked ends 60 of the rim engaging lugs 41 and 42 positively engage the rim edges 61. Two nuts 69 on the threaded end 68 are provided for convenience, as these nuts, when tightened on each side of the anchoring web 66, serve to hold the cable 65 in place for ease in manipulating the device.

It may also be noted that the device is so designed that it may be reversed in direction for use, so that it is unnecessary to spend any time to ascertain how the device is to be oriented before being applied to the tire. Moreover, the device may be applied to either a driven or a free wheeling wheel, without changing the design of the device.

In all forms of the invention, an effort has been made to obtain symmetry of the device for weight balancing purposes and ease of manufacture. It is to be understood that the forms of my invention, herein described, are to be taken as preferred examples of the same, and that various changes may be resorted to without departing from the spirit of my invention or the scope of the subjoined claims.

What is claimed is:

1. A traction gaining device for use with a substantially annular body adapted to tractionally move relative to a surface, said body having two opposite substantially annular side surfaces with a substantially annular surface bearing portion therebetween, said traction gaining device comprising first and second side arms each having first and second ends, respectively, said first ends each having a surface adapted to be drawn toward each other to engage at least a part of said opposite body side surfaces, a bearing head at each of said second ends, transverse support means disposed externally of said surface bearing portion and adapted to slidably engage said bearing heads, and anchoring means for drawing said surfaces of said first ends into contact engagement with said at least a part of said opposite body side surfaces.

2. A traction gaining device for use with a substantially annular body adapted to tractionally move relative to a surface, said body having two opposite substantially annular side surfaces with a substantially annular surface bearing portion therebetween, said traction gaining device comprising a first side arm having first and second ends, a second side arm having first and second ends, said first ends having a surface adapted to be drawn toward each other to engage at least a part of said opposite body side surfaces, a bearing head at each of said second ends, a bore defining surface in said bearing heads with the axes thereof in alignment transverse of said surface bearing portion, transverse support means external of said body and receivable in said bores, and means for varying the relative distance between said bearing heads to effect an engagement of said surface of said first ends with said part of said body side surfaces.

3. A traction gaining device for use with a substantially annular revoluble body adapted to tractionally move relative to a surface, said body having two opposite substantially annular side surfaces with a substantially annular surface bearing portion therebetween, said traction gaining device comprising first and second complementary members having first and second side arms, said first and second side arms each having first and second ends, said first ends having a surface adapted to engage at least a part of said body side surfaces, a bearing head at each of said second ends, at least one bore defining surface in each of said bearing heads with the axes thereof in alignment transverse of said surface bearing portion, transverse support means external of said body and receivable in said bores, said transverse support means comprising at least one support guide pin adapted to slidably engage at least one of said bores, anchoring means for varying the relative distance between said bearing heads to effect engagement of said surface of said first ends with said at least a part of said body side surfaces, and ears projecting laterally from said second ends and contoured to fit the surface bearing portion.

4. A traction gaining device for use with a substantially annular revoluble body adapted to tractionally move relative to a surface, said body having two opposite substantially annular side surfaces with a substantially annular surface bearing portion therebetween, said traction gaining device comprising first and second complementary members having first and second side arms, said first and second side arms each having first and second ends, said first ends having a surface adapted to engage at least a part of said body side surfaces, a bearing head at each of said second ends, at least one bore defining surface in each of said bearings heads with the axes thereof in alignment transverse of said surface bearing portion, transverse support means external of said body and receivable in said bores, said transverse support means comprising at least one support guide pin adapted to slidably engage at least one of said bores, and anchoring means for varying the relative distance between said bearing heads to effect engagement of said surface of said first ends with said at least a part of said body side surfaces, said anchoring means including transverse screw means to effect movement of said bearing heads along said at least one support guide pin.

5. A traction gaining device for use with a substantially annular revoluble body adapted to tractionally move relative to a surface, said body having two opposite substantially annular side surfaces with a substantially annular surface bearing portion therebetween, said traction gaining device comprising first and second complementary members having first and second side arms, said first and second side arms each having first and second ends, said first ends having a surface adapted to engage at least a part of said body side surfaces, a bearing head at each of said second ends, at least one bore defining surface in each of said bearing heads with the axes thereof in alignment transverse of said surface bearing portion, transverse support means external of said body and receivable in said bores, said transverse support means comprising at least one support guide pin adapted to slidably engage at least one of said bores, and anchoring means for varying the relative distance between said bearing heads to effect engagement of said surface of said first ends with said at least a part of said body side surfaces, said anchoring means including transverse cable means to effect movement of said bearing heads along said at least one support guide pin.

6. A traction device for use in conjunction with a vehicle wheel provided with a rim having a tire thereon, said tire having side walls and a tread portion, said traction device comprising first and second side arms each having first and second ends, respectively, said first ends each having a surface adapted to be drawn toward each other to engage at least a part of said side walls, a bearing head at each of said second ends, transverse support means disposed externally of said tread portion and adapted to slidably engage at least one of said bearing heads, anchoring means for drawing said surfaces of said first ends into contact engagement with said side walls, and a rim engaging lug fixedly carried by each of said first and second side arms and adapted to positively engage said rim as said side arms are brought into engagement with said side walls.

7. A traction device for use in conjunction with a vehicle wheel provided with a rim having a tire thereon, said tire having side walls and a tread portion, said traction device comprising first and second arms each having first and second ends, respectively, said first ends each having a first interfitting portion and a second portion, said second portions of said first ends each having a surface adapted to be drawn toward each other to engage at least a part of said side walls, a bearing head at each of said second ends, a bore defining surface in said bearing heads with the axes thereof in alignment transverse of said tread portion, transverse support means disposed externally of said tread portion and receivable in said bores, rim engaging lugs having a hooked end and having a second interfitting portion, means for fastening said first and second interfitting portions together in a fixed relationship, said hooked ends being adapted to positively engage said rim, and means for varying the relative distance between said bearing heads to effect an engagement of said surface of said first ends with said side walls and to effect said positive engagement of said hooked ends with said rim.

8. A traction gaining device for use in conjunction with a vehicle wheel provided with a rim having a tire thereon, said tire having side walls and a tread portion, said traction gaining device comprising first and second complementary members having first and second side arms, said first and second side arms each having first and second ends, said first ends having a surface adapted to engage at least a part of said side walls, a bearing head at each of said second ends, at least one bore defining surface in each of said bearing heads with the axes thereof in alignment transverse of said tread portion, transverse support means external of said tread portion and receivable in said bores, said transverse support means comprising at least one support guide pin adapted to slidably engage at least one of said bores, anchoring means for varying the relative distance between said bearing heads to effect engagement of said surface of said first ends with said at least a part of said side walls, said anchoring means including transverse cable means to effect movement of said bearing heads along said at least one support guide pin, and a rim engaging lug fixedly carried by each of said first and second side arms and adapted to positively engage said rim as said side arms are brought into engagement with said side walls.

EMIL LINDERME.

REFERENCES CITED

The following references are of record in the file of this patent:

UNITED STATES PATENTS

| Number | Name | Date |
|--------|------|------|
| 328,070 | Rowlett | Oct. 13, 1885 |
| 1,800,878 | Vosburgh | Apr. 14, 1931 |
| 2,343,131 | Austin | Feb. 29, 1944 |